(12) United States Patent
Byrne

(10) Patent No.: US 7,478,058 B2
(45) Date of Patent: Jan. 13, 2009

(54) COLLABORATIVE COMMERCE HUB

(75) Inventor: Patrick Byrne, Galston (AU)

(73) Assignee: SPC Holdings Pty Limited, Carinbah, NSW (AU)

( * ) Notice: Subject to any disclaimer, the term of this patent is extended or adjusted under 35 U.S.C. 154(b) by 412 days.

(21) Appl. No.: 10/416,901

(22) PCT Filed: Nov. 15, 2001

(86) PCT No.: PCT/AU01/01495

§ 371 (c)(1),
(2), (4) Date: Aug. 27, 2003

(87) PCT Pub. No.: WO02/41197

PCT Pub. Date: May 23, 2002

(65) Prior Publication Data

US 2004/0030611 A1 Feb. 12, 2004
US 2005/0060235 A2 Mar. 17, 2005

(30) Foreign Application Priority Data

Nov. 15, 2000 (AU) .................................. PR1637
Jan. 19, 2001 (AU) .................................. PR2647

(51) Int. Cl.
*G06Q 30/00* (2006.01)
(52) U.S. Cl. ................. 705/26; 705/1; 705/22; 705/27; 705/28
(58) Field of Classification Search ............ 705/26, 705/27, 22, 28
See application file for complete search history.

(56) References Cited

U.S. PATENT DOCUMENTS

| | | | | |
|---|---|---|---|---|
| 5,592,375 A | * | 1/1997 | Salmon et al. ................. 705/7 |
| 5,710,887 A | * | 1/1998 | Chelliah et al. ............... 705/26 |
| 5,974,395 A | * | 10/1999 | Bellini et al. .................. 705/9 |
| 6,282,517 B1 | * | 8/2001 | Wolfe et al. ............... 705/36 R |
| 6,351,738 B1 | * | 2/2002 | Clark ........................... 705/37 |
| 6,606,744 B1 | * | 8/2003 | Mikurak ..................... 717/174 |
| 6,934,692 B1 | * | 8/2005 | Duncan ........................ 705/35 |
| 2001/0034622 A1 | * | 10/2001 | Davis ............................ 705/4 |

(Continued)

FOREIGN PATENT DOCUMENTS

WO WO 0154066 A 7/2001

OTHER PUBLICATIONS

Partitioning is key to shared nothing. eWeek, May 22, 2000, p. 26.*

*Primary Examiner*—Jeffrey A. Smith
*Assistant Examiner*—Jason Dunham
(74) *Attorney, Agent, or Firm*—Wood, Philips, Katz, Clark & Mortimer

(57) ABSTRACT

A server acts as the hub of a collaborative commerce system. Suppliers of goods or services self publish information to the hub. Buyers are able to query the hub for product and service availability, price etc. Buyers are able to integrate real time multi product and multi service orders from multiple suppliers, carriers and field serve providers and thus secure available goods as well as the delivery and installation of those goods from the records available on the hub. Once an order is complete to the buyer's satisfaction, the order is transmitted to the hub. The hub then transmits the appropriate information to the relevant suppliers, carriers and installers as required. The system also provides for a system of virtual partitioning of a supplier's inventory.

59 Claims, 10 Drawing Sheets

U.S. PATENT DOCUMENTS

2003/0069922 A1* 4/2003 Arunachalam .............. 709/203
2003/0172002 A1* 9/2003 Spira et al. ................... 705/27
2003/0177026 A1* 9/2003 Purcell ......................... 705/1

* cited by examiner

Work Order 110

Work Order Number [          ]

*Please quote this number on all correspondence*

Retailer Name : [          ]   Branch Name : [          ]

| | | | |
|---|---|---|---|
| Name: | [          ] | Installation Time: | [          ] |
| Address 1: | [          ] | Installation Date: | [          ] |
| Address 2: | [          ] | Product: | [          ] |
| Address 3: | [          ] | Make: | [          ] |
| City/Town: [    ] Post Code/Zip: [    ] | | Model: | [          ] |
| Phone #: [    ] Facsimile #: [    ] | | Category: | [          ] |
| Phone #: [    ] Mobile/Cell #: [    ] | | Class: | [          ] |
| | | Serial No.: | [          ] |

Special Instructions

[                                                                 ]

Customer
Customer Care Questionnaire 111    Tick Tick

1. Did the installer arrive on time ?  Y  N
2. Was the installer neat and tidy ?  Y  N
3. Was the installer courteous and listen to your requests ?  Y  N
4. Was the installation completed on the same day or within the quoted timeframe?  Y  N
5. Did the installer advise the best location for the installation of the product ?  Y  N
6. Has the installation been completed to your satisfaction ?  Y  N
7. Was the product fully demonstrated to your satisfaction ?  Y  N
8. Was the product fully operational on completion of installation ?  Y  N
9. Do you understand all the products features ?  Y  N
10. Do you understand the products maintenance requirements ?  Y  N
11. Was the installation area left clean and tidy?  Y  N
12. Was the installation completed without damage to your property ?  Y  N

Installer
Quality Assurance Check List    Tick Tick

1. Was the installation site dry and safe ?  Y  N
2. Was the installation site flat and stable ?  Y  N
3. Were all the recomended minimum clearances adhered too ?  Y  N
4. Were all electrical cables terminated correctly ?  Y  N
5. Were all manufacturers tests and basic operations performed ?  Y  N
6. Did you demonstrate the product basic features to the customer ?  Y  N
7. Did you demonstrate the product maintenance requirements ?  Y  N
8. Was the installation site left clean and tidy ?  Y  N
9. Was there any damage to the customers property ?  Y  N IF YOU HAVE ANSWERED "NO" TO ANY OF THE ABOVE QUESTIONS, WE WOULD APPRECIATE YOUR COMMENTS:

_____
_____
_____
_____

| | |
|---|---|
| Customers Name : _____ | Installer Name : _____ |
| Customers Signature : _____ | Installer Signature : _____ |
| Completion Date : _____ | Completion Date : _____ |

Figure 5

Installer:
Customer Care Questionaire

Customer Reponses for Order 178-188-861-71:

| Question | Customer Reply |
|---|---|
| Did the Installer arrive at the requested time? | Yes ☐ No ☑ |
| Was the Installer neat & tidy? | Yes ☐ No ☑ |
| Was the Installer courteous & did he/she listen to your requests? | Yes ☐ No ☑ |
| Was the Installation completed on the same day? | Yes ☐ No ☑ |
| Did the Installer discuss the location of the installation of the appliance to you? | Yes ☐ No ☑ |
| Has the installation been completed to your satisfaction? | Yes ☐ No ☑ |
| Was the system fully demonstrated to you? | Yes ☐ No ☑ |
| Do you understand all the systems features? | Yes ☐ No ☑ |
| Do you understand all the systems maintenance requirements? | Yes ☐ No ☑ |
| Was there any damage done to your property? | Yes ☐ No ☑ |
| Was the installation area left clean & tidy? | Yes ☐ No ☑ |

◁ BACK    ☐ UPDATE

Figure 6

Installer:
QA Rating

Your quality assurance rating for this job is 5 (Terrible)

Your overall quality assurance rating for this job is 3 (Fair)

( Next ▷ )

Figure 7

COLLABORATIVE COMMERCE HUB

TECHNICAL FIELD

The invention pertains to the management, distribution and supply of goods and services, and to software and business methods which facilitate and integrate the co-ordination of suppliers, buyers, carriers and service providers (installer, field service warranty, call centres, third party warehousing) of goods/services with respect to a customer (end user).

BACKGROUND ART

A single conventional order for goods or services may comprise the purchase of a variety of different kinds of goods or services. Several different suppliers may be required to fulfil a particular order. Accordingly, several different carriers may be required to transport the goods from supplier through to the final delivery address or addresses. The final delivery addresses might be the same as or different than an installation address. In some situations, no delivery or installation is required.

DISCLOSURE OF THE INVENTION

The present invention provides methods, business methods, hardware and software for collecting, integrating, and interpreting order information, then multicasting orders to one or more suppliers, shipping advices to one or more carriers and installation advices to one or more service providers.

In preferred embodiments, the orders and advices are multicast to the appropriate parties according to a combination of self-published product supply factors including product data, category data, class data, capability data, capacity data, availability data and geographic service area or any combination of these factors.

In other embodiments, supplier data (including stock availability by product, warehouse location and buyers), carrier data (such as capability, capacity and availability by product, category, class, geographic area, quality of service and buyer), and service provider data (such as capability, capacity and availability by product, category, class, geographic area, quality of service and buyer) are published to buyers from an interactive searchable database, over a network such as the Internet.

In some embodiments, the execution of a single or multi supplier, carrier and service provider final order is completed and actioned, once compiled, with a single instruction, from a single mouse click in a graphical user interface.

BRIEF DESCRIPTION OF THE DRAWINGS

FIG. 5 is a work order form with integrated customer care questionnaire;

FIG. 6 is a web based submission form for customer responses gathered in the questionnaire depicted in FIG. 3;

FIG. 7 is a web based service provider viewable quality assurance rating;

MODES FOR CARRYING OUT THE INVENTION

The invention provides an end-to-end supply chain management system and business methods designed to deliver financial benefits in real time to trading partners that operate in diverse vertical industries. Together and loosely defined, the presently discloses methods, software and hardware and is referred to, for convenience, as a system. The system coordinates cross-trading partners processes via a suite of software solutions.

The methods can be used simultaneously by multiple trading partners, on a many to many basis, allowing users to access the same functionality in real time. This allows multiple buyers to enter multi product-multi supplier integrated orders to coordinate the fulfillment of 3rd party field services (where applicable).

Figure 1:
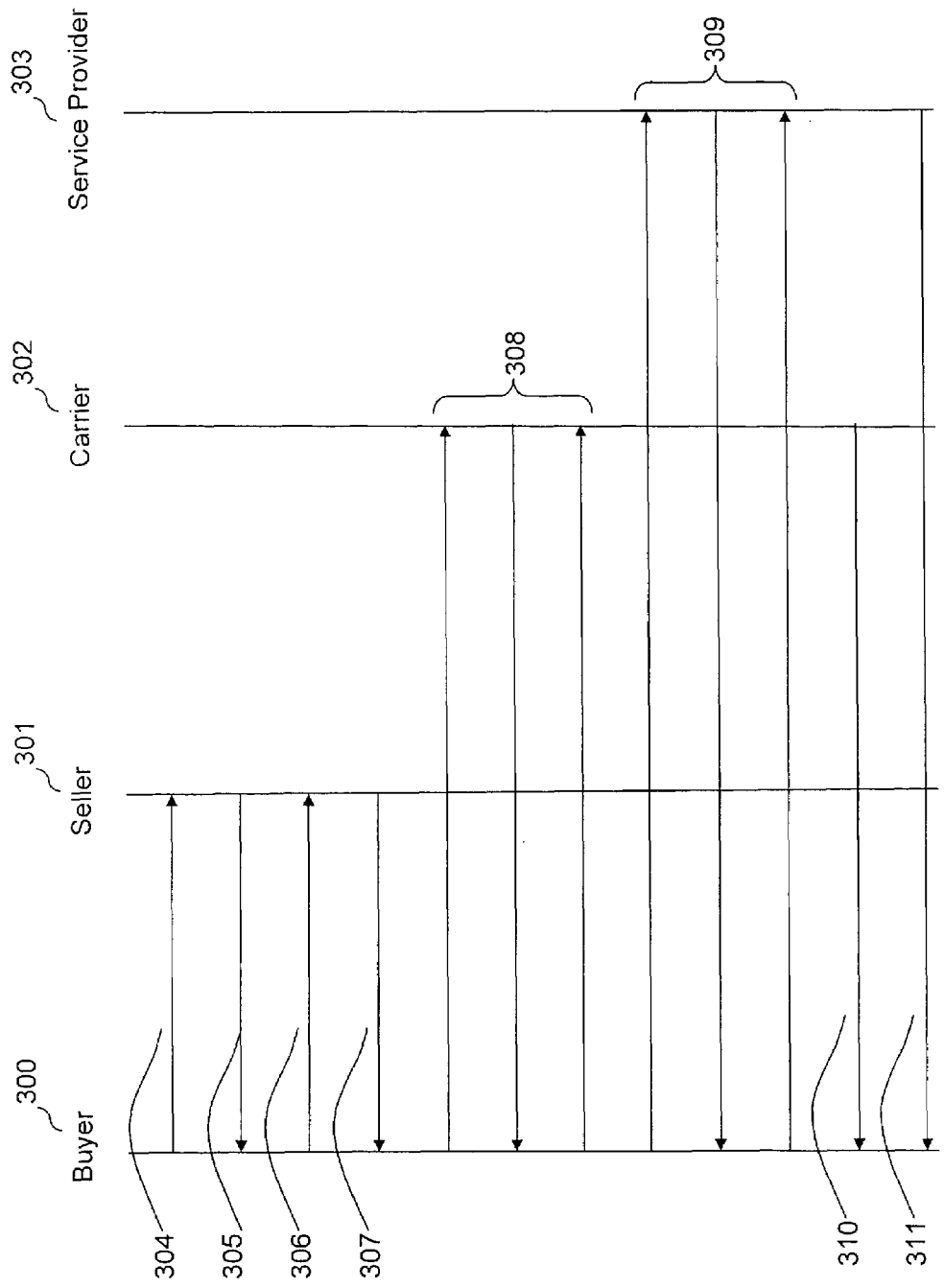
FIG. 1 is a schematic diagram illustrating the type of prior art message switching is alleviated by the present invention.

The present system does not rely on trading partner application-to-application message-switching systems to complete business transactions. As shown in FIG. 1, message switching comprises a sequence of messages which are exchanged between a buyer 300 and the other participants in the supply chain such as the seller 301, carrier 302 and Service Provider 303. The first message 304 passes between the buyer and the seller and request whether or not a particular product is available. The seller responds with a message 305, for example indicating that the product is available. Next the buyer places an order for the product 306. The seller confirms receipt of the product order with a separate message 307. The process continues with a series of exchanges between the buyer and the carrier 308. An exchange of messages is also conducted with the service provider 309. The process finishes with the carrier 302 sending proof of delivery 310 to the buyer and with the service provider forwarding proof of service 311 to the buyer. By eliminating the need for message switching:

The system does not require expensive, technically complex IT communications support traditionally required for applications message switching and backend integration.

The system handles multiple transaction volumes in comparison to individual point-to-point message switching/middleware solutions.

The system present trading partners with a major competitive advantage.

The system software is written in Cold Fusion and currently running in a SQL 7.0/2000 environment, though could equally run, for example, on an Oracle or DB2 platform as the applications business logic is database independent.

Figure 2:
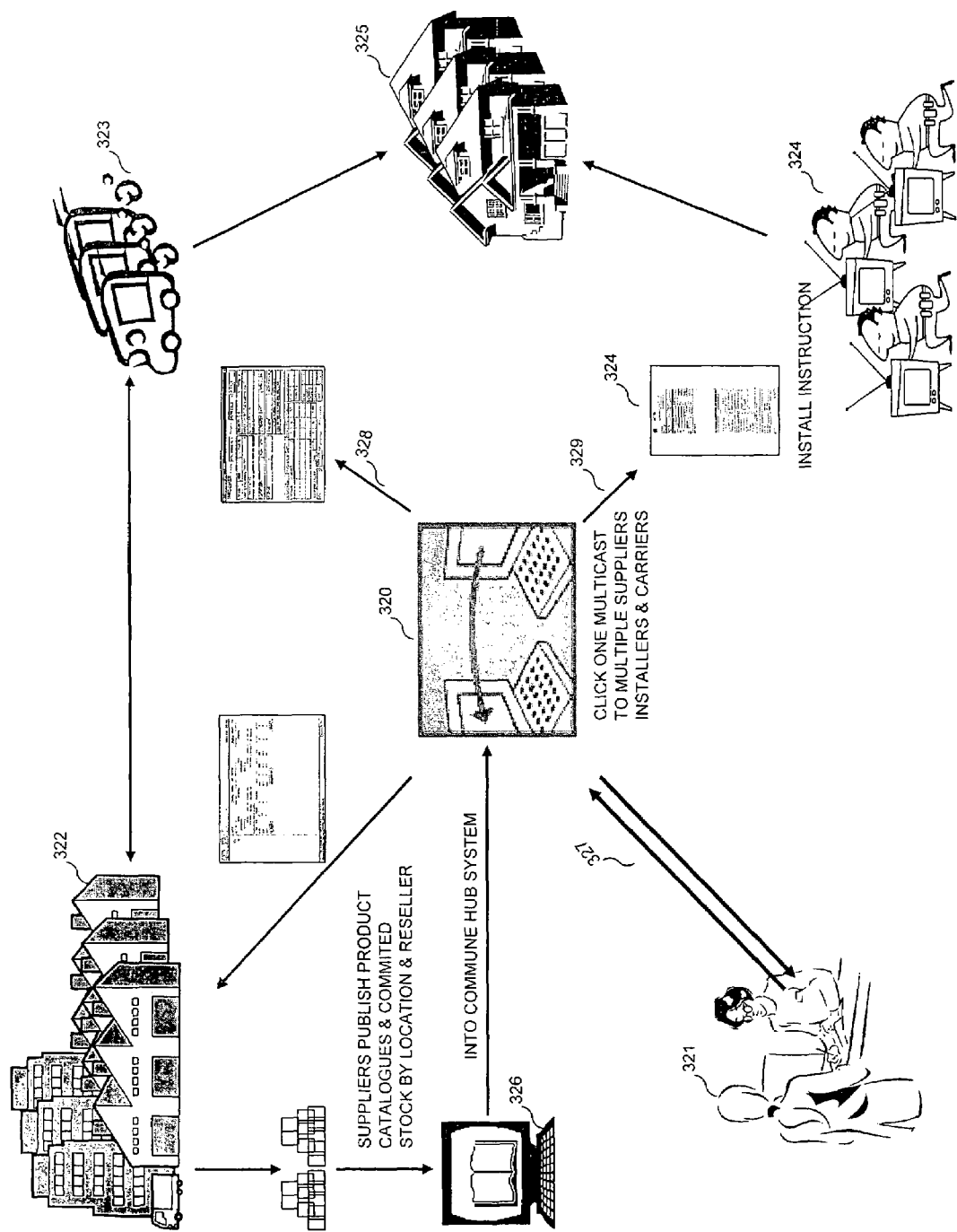
FIG. 2 is a schematic diagram illustrating an overview of the methods associated with the present invention.

As shown in FIG. 2, the system enables participants to self publish real time information via dynamic catalogues. The system then processes the transaction (in real time) and systematically notifies the relevant users of the resulting supply chain events. The system allows all supply chain partners to securely integrate and process their transactions in a shared environment.

The system enables incremental implementation by each trading partner, with the system capable of being customised to suit individual users. The system currently comprises 10 individual software modules.

Inventory Enables suppliers, in real time, to publish their stock availability to order or promise (e.g. advance shipping notice)—by product, sub product, category, class, location and buyer, on a 24×7 day basis, and receive orders electronically.

Ordering Enables buyers to integrate in one order—multi product, multi supplier, multi carrier, multi service provider, multi sub orders in real time; then multicast only the relevant information to each supply chain partner.

Scheduling Enables carriers and service providers to publish their capabilities, capacities, availability and pricing by product, category, class, service area (e.g. postal or zip code) and buyer. Automated work orders are then dynamically generated at the point of sale and received by the relevant supply chain partner.

Settlement Enables trading partners to receive orders, generate invoices and settle accounts on line.

Returns Enables buyers, suppliers carriers and service providers to coordinate the returns process (in real time), including management of return authorities, product disposition and test and repair facilities.

Warranty Enables end user registration on line, establishing ownership, location and purchase dates. Links the end user, service centre and supplier automating the warranty claims process.

Build Enables build to order, configure to order and ship to order at buyers point of sale; linking buyers, suppliers, carriers and 3rd party installers (in real time), to customise client orders, deliver and install them directly without intermediaries.

Spares Brings inter-operability to suppliers and their service network in the areas of spare parts inventory, availability, pricing, shipping status, multi supplier integrated ordering, fulfillment and warranty/sales reconciliation. Also allows suppliers to broadcast service literature, service tips, product modifications, assembly delays/variations.

Forward Enables one time data capture, dynamic concurrent workflows, and track and trace for freight forwarders, suppliers, manufacturers, domestic carriers, 3rd party warehousing and customs clearance agents.

Marketing Enables suppliers to video stream, multicast product information, training promotion and product launches to individual or many buyers. Buyers can issue request for catalogue inclusions and suppliers can respond.

The system's software platform contains all of the above specified business processes and work flows within its core. Members need only self publish their data to specific modules within the core. As shown in FIG. 2, the Hub or central server 320 integrates and co-ordinates the actions of a buyer 321 a product supplier 322, a carrier or deliverer 323 and installer or other service provider 324 and ultimately the consumer 325. Using FIG. 2 as an overview, it can be seen that the supplier 322 self publishes dynamic product catalogues and real time inventory availability 326 electronically and into the Hub 320. This allows the seller or buyer 321 to access the self published catalogues in real time and place a confirmed order or multi order 327 with the Hub 320. This same multi product order may be accompanied by a multiple delivery and installation orders and instructions. The Hub forwards the appropriate delivery instructions 328 to the appropriate carrier and simultaneously provides work orders for installations 329 to the appropriate service providers 324. Service providers is intended to refer to installers or other field service providers. Ultimately, the Hub co-ordinates the delivery schedule of the carrier 323 with the installation schedule of the service provider 324 so that the ultimate consumer 325 receives the appropriate products and service at the correct time.

Further small freight forwarding company, using the system, can combine the services of other members within the network, offering an end-to-end fulfillment service to their customer. In effect, providing all of the benefits of a large multinational freight forwarder, but without the unwelcome financial overhead. The freight forwarder, when combined with other clustered networked partners, is then able to present as a virtual organisation to the marketplace.

The system's software modules are based upon open systems technology. The system offers the user increased flexibility and easy integration to other networks. As a network centric system, users can choose to connect to the system via intranet, Internet or Virtual Private Network (VPN).

The system provides for self-registration, self-regulation and end user management, which allows for rapid implementation of any supply chain strategy. The system scales from a thin client (browser based PC) requiring no data mapping, through to full back end legacy systems integration. Thus, the system facilitates high-speed scalability for any supply chain network participants.

The system is network centric and customer centric (at its presentation layer); there are no geographic or industry impediments to the global reach and usefulness of the system.

Figure 3:
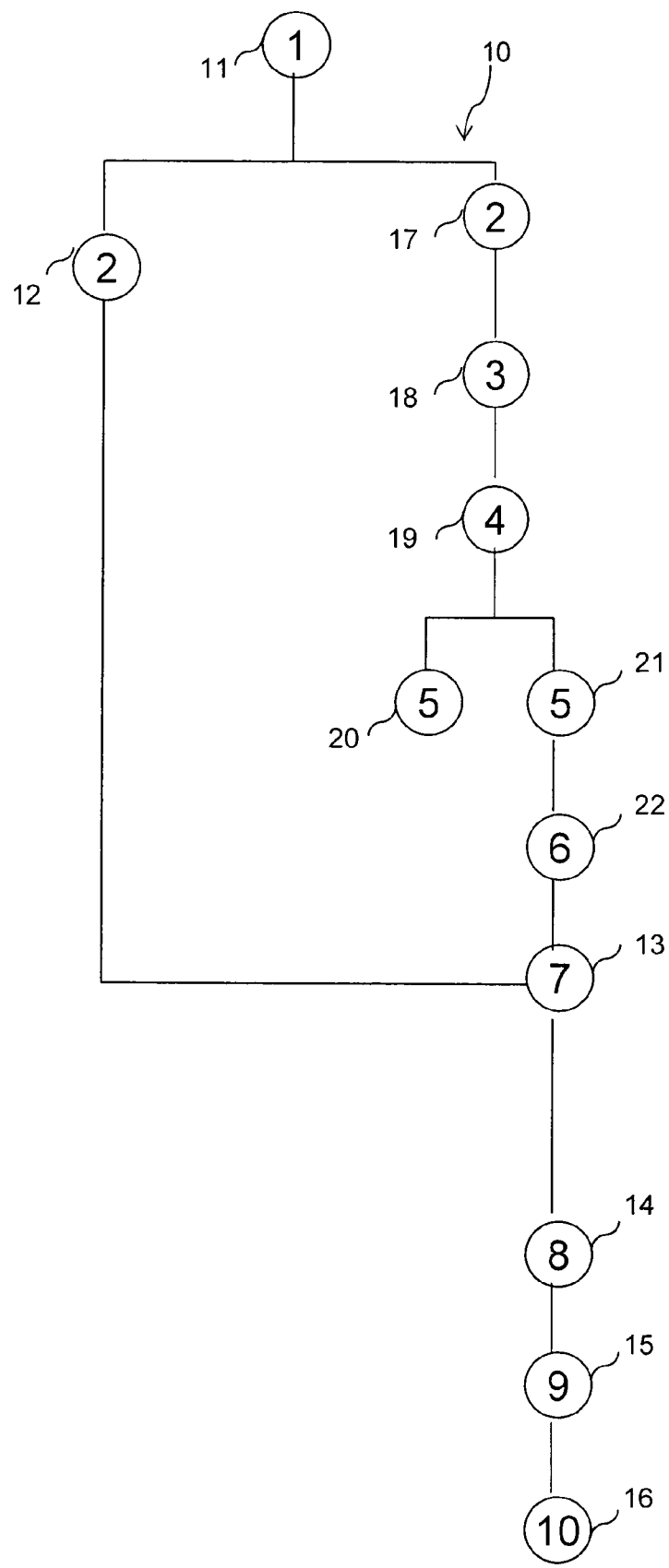
FIG. 3 is a schematic diagram illustrating the current supplier single order process.

As shown in FIG. 3, the prior art single order process 10, as seen from the buyer's perspective, commences with a buyer querying the internal computer system for the status of the selected goods 11, that is, whether or not the selected goods are in stock. If the goods are in stock/store 12, the next step 14 is to arrange delivery with the store driver or other delivery company and contact the customer to advise of a delivery date and supply the customers with the identity of the installer(s), if required. At this point, the customer would arrange the installation themselves directly with the service provider 14. Finally, the goods are delivered to the customer 15. Installation occurs 16 some time after delivery is effected.

If the goods are out of stock, then the buyer's query 11 is followed by multiple phone calls and faxes to suppliers 17. Enquiries to suppliers will generally be restricted to normal business hours (e.g. Monday-Friday 9-5 pm) however in the case of late night or weekend trading, it is expected that the supplier will respond on the next business day, perhaps later. A negative response from the supplier will require the selection of an alternate supplier, which further delays the delivery of stock. Once the relevant enquiries are made 17, the buyer awaits confirmation from the supplier of stock availability by telephone or facsimile 18.

Upon confirmation, the buyer advises the customer of the status by telephone or facsimile and receives a customer decision 19. If the customer decides not to proceed, the sale is lost and the order is cancelled 20. If the order is to proceed, it is placed by telephone or facsimile 21. Eventually, the stock is delivered to the buyer store 22 and from this point on, the process follows the same path as an order which is in stock 12, that is, proceeding to eventual delivery to the customer 15 and installation 16 of product, if required.

It is worth noting that the above referenced conventional method requires stock delivery to the buyer store/warehouse prior to customer delivery. Further, the prior method is relatively inflexible as to the timing of matter such as delivery and installation, old product removal, and packaging removal.

Figure 4:
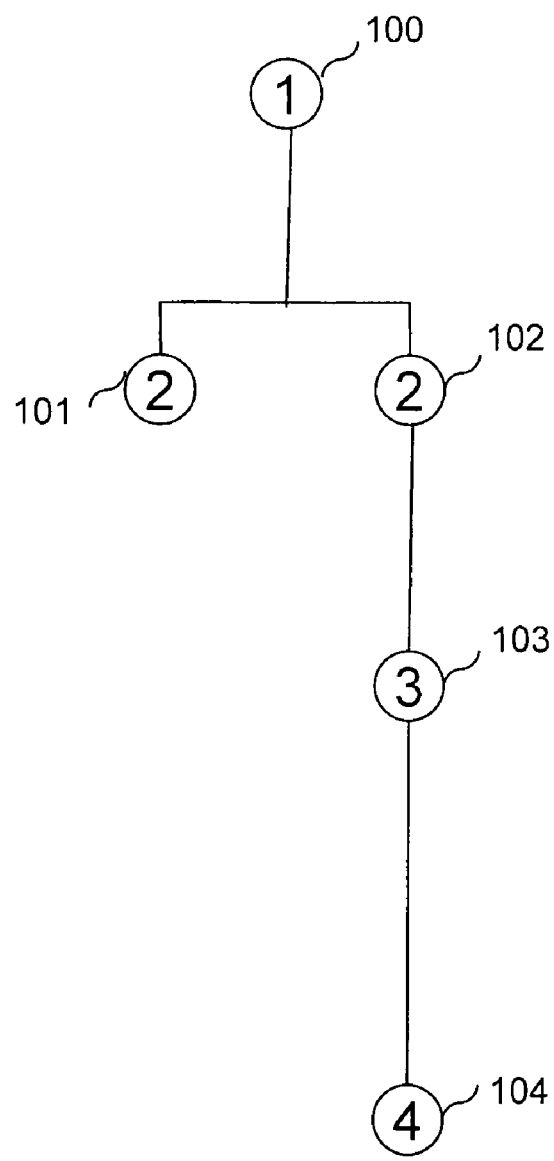
FIG. 4 is a schematic diagram illustrating the methods of the present invention.

As shown in FIG. 4, the present invention proposes methods which are available at all times of the day and night, every day of the year. This is because all parties to the system can connect to a 24 hours×7-day central hub of a network and interact with the scalable system using either an Internet browser or systems integrated software.

The method commences with a buyer querying a remote database with regard to stock availability, as dynamically self published by the goods suppliers 100 in advance. The database is accessible over the Internet and uses a conventional browser, based on the entry of the appropriate user ID and password. In the alternative, the system may be systems integrated into a buyer, supplier, carrier, or service provider's enterprise resource system (ERP). If a particular product is out of stock, the buyer is notified on-line immediately 101 and proceeds to re-enter a new query based on other goods and/or suppliers. If the database indicates that the selected goods are in stock then the buyer proceeds to the next step 102. This next step requires the buyer to input the customer selections, that is, the suppliers and models of the selected goods as well as the times and dates for delivery, installation, removal of packaging and the removal or disposal of the old product. Once this data is entered and integrated on one screen, the buyer proceeds to the next and final step 103. The buyer presses a single "button" in a graphical user interface, which initiates a multicast. The multicast comprises of orders which are issued to multiple appropriate suppliers, as well as multiple shipping advices to the appropriate carriers required to transport the goods directly to the customer or agent, as well as multiple installation advices to the one or more appropriate service providers which may be required to complete the order, by customer defined date and time schedules at the point of sale.

A distinguishing feature of the invention is the way that suppliers, carriers and service providers are selected (capability, capacity, availability, area, product, category, class and quality) to complete an order once the customer related data is entered into the system. With respect to installations, each service provider will be provided with a work order 110 (FIG. 5), which is a physical form, which is carried into each installation. In order to get paid, the service provider must obtain a quality report in the form of a customer care questionnaire 111 (FIG. 5) from the appropriate customer. The customer is presented with a form and asked to rate the service provider according to the quality of the job performed. Factors which might be considered include promptness, tidiness, quality of installation, courteousness etc. The service provider is then required to fax a copy of the quality report 110 and 111 to a central place of reporting. The service provider also inputs the data from the customer's report into an electronic form 112 (FIG. 6) or Internet based system with the proviso that the hard copy also be faxed as mentioned above. A service provider is thereby rated according to the quality of his work by the customer. A service provider may log onto the system and view their own quality rating 113 (FIG. 7) as evaluated by their various customers. Where the order data entry step 102 (FIG. 4) determines that two or more service providers are suitable for a particular order, the one with the highest quality rating may be selected to fulfil the order.

Selection of the appropriate carrier may be performed in much the same way. A carrier may be selected according to their capability, capacity or price but a carrier may also be selected according to their quality as it is evaluated by their customers and input to a central record keeping location as mentioned above.

Selection of a suitable supplier of goods may also be performed on a quality-rating basis. A supplier can be rated according to their consistency and timeliness of supply, rate of product returns or other factors, which form a reasonable basis for performing a quality evaluation. In this way, a supplier with a higher quality rating can be selected over a supplier with a lower quality rating with regard to the fulfillment of any particular order.

From the above description it will be appreciated that the ability to search a database of real time multi supplier published available inventory information coupled with the ability to integrate multi supplier, multi carrier and multi service provider orders, with customer defined date and time schedules in one screen and then generate various multicasts to suppliers, carriers and service providers in a one click process, provides a process transformation with enormous flexibility and streamlined operation when compared to prior methods. The business processes outlined are applicable to any industry, for example, Information Technology & Telecommunications (ITT), Automobile, Insurance, Freight Forwarding etc., where facilitation, integration and co-ordination of suppliers, buyers, carriers, and service providers (Installer, Field Service Warranty, Call Centres, Third Party Warehousing) of goods/services with respect to the customer (end user).

Figure 8:
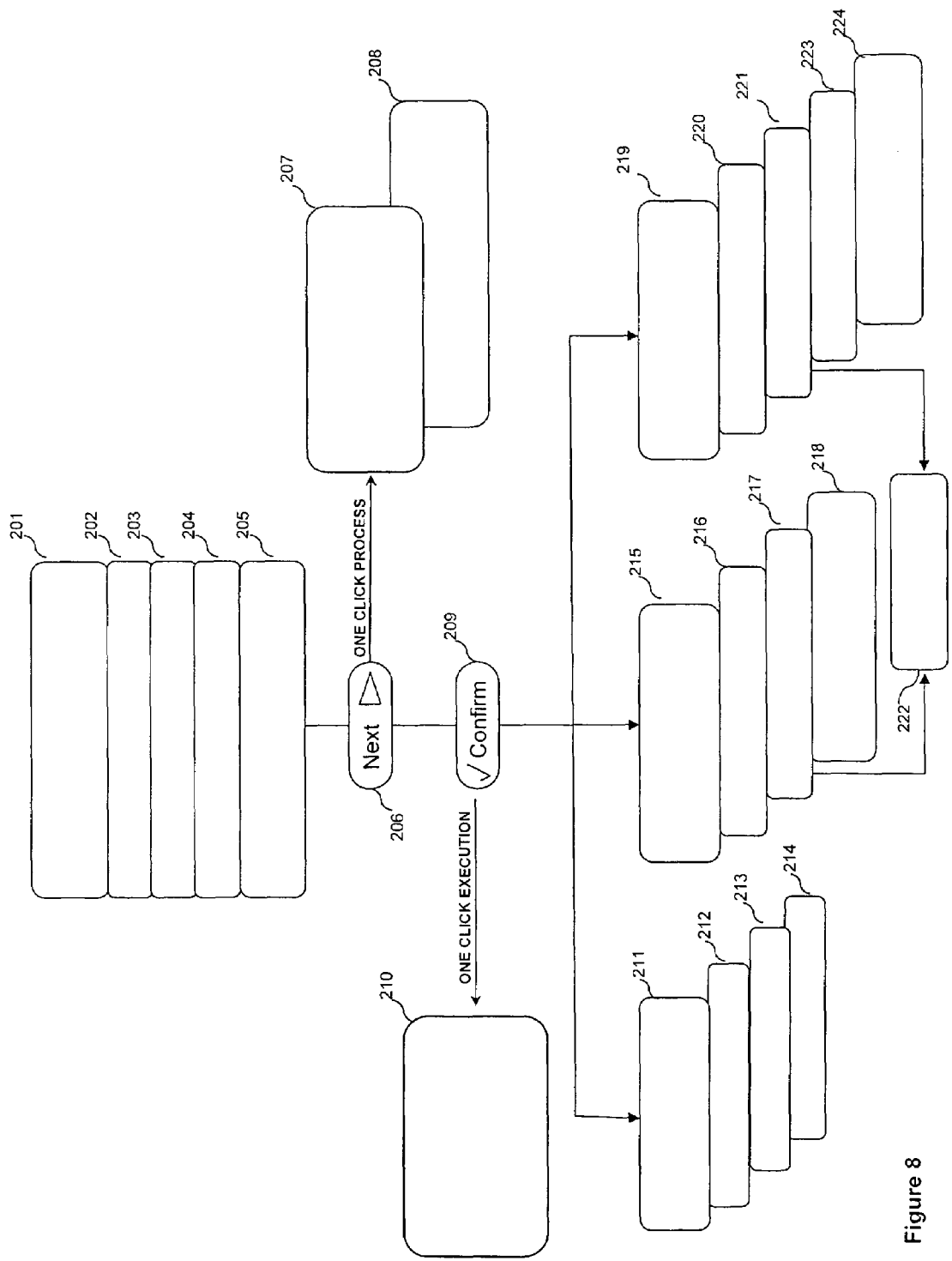
FIG. 8 is a schematic diagram illustrating a multi-process integrated order.

FIG. 8 illustrates particular examples and specific details of the methods associated with the present invention. As previously described, the process of initiating a multi-process integrated order may be seen as beginning at the point of sale 201 to a one with the buyer logging into a central server from, for example, conventional PC running conventional browser software. The buyer then enters the order number 202 and the customer details 203. At this point, and using the browser software, the buyer can confirm (from existing published information) in real time the multi product and multi supplier product availability 204. The buyer is then able to define single or multi deliver point instructions, single or multi carrier service instructions and single or multi service provider service instructions 205. Once these details are entered through the browser interface, the buyer clicks a single button, for example, a "next" button 206 and this causes the processing of the order in real time 207. The result of the order processing is that carriers and service providers are selected automatically on the basis of self published capability, capacity, availability, service area, category, class, price, and quality of service 208. Once the order has been fully processed and prepared (206, 207 and 208) the pressing of a single confirmation type button 209 causes the execution of the order in its entirety. Once the order is confirmed 209 this causes the execution, dynamically and in real time of a concurrent series of supply chain events, particularly the multicasting of the relevant details to the relevant participants in the supply chain 210. Confirmation 209 and the subsequent execution 210 causes the relevant product orders to be multicast to each applicable supplier, the relevant consignment notes to be multicast to each applicable carrier, the relevant service work orders to each applicable service provider.

As further shown in FIG. 8, confirmation 209 causes, for example, the suppliers to receive email notifications 211 with hyper links to log into the system to retrieve orders. Consequently, the orders are retrieved 212 whereupon the supplier accept purchaser orders and makes products available for dispatch to end users 213. The order is acknowledged by email, the date and time stamp being recorded 214.

Similarly, upon confirmation, 209 service providers receive email notification with hyper links to log into the system to retrieve orders 215. The service provider retrieves orders and where applicable, special job instructions 216. The service providers then accept and print orders 217. When installation is physically completed, the service provider confirms by completing electronically the quality assurance sheet which is provided by the system 218.

As further shown in FIG. 8, upon confirmation 209, carriers receive email notification with hyper links to log into the system to retrieve orders 219. This causes the retrieving of orders and where applicable, special job instructions 220. The carrier accepts orders 221 (or rejects them 222) and when accepted, picks up products and delivers them to the end users 223. The carriers confirm delivery by completing electronically, a quality assurance form provided by the system 224.

Figure 9:
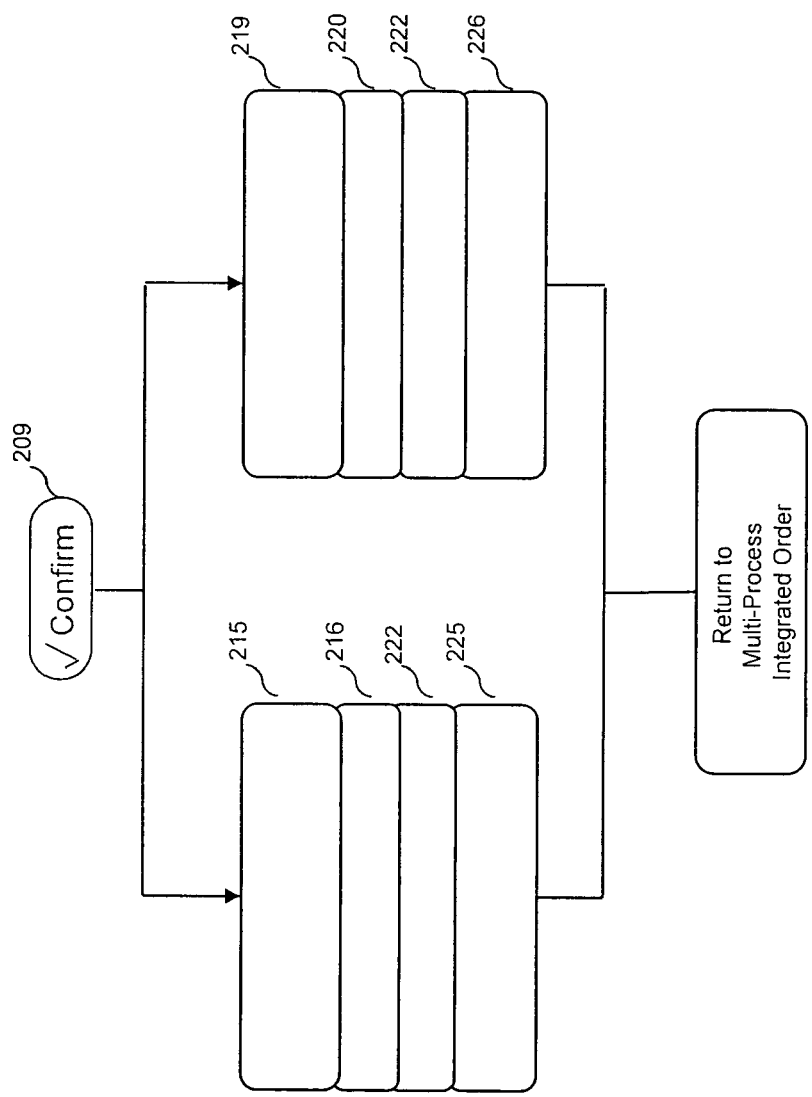
FIG. 9 is a schematic diagram illustrating rejected order processing.

As shown in FIG. 9, the rejection of an order by a service provider or carrier 222 causes the system to re-allocate the order to the next available service provider 225 or next available carrier 226.

Figure 10:
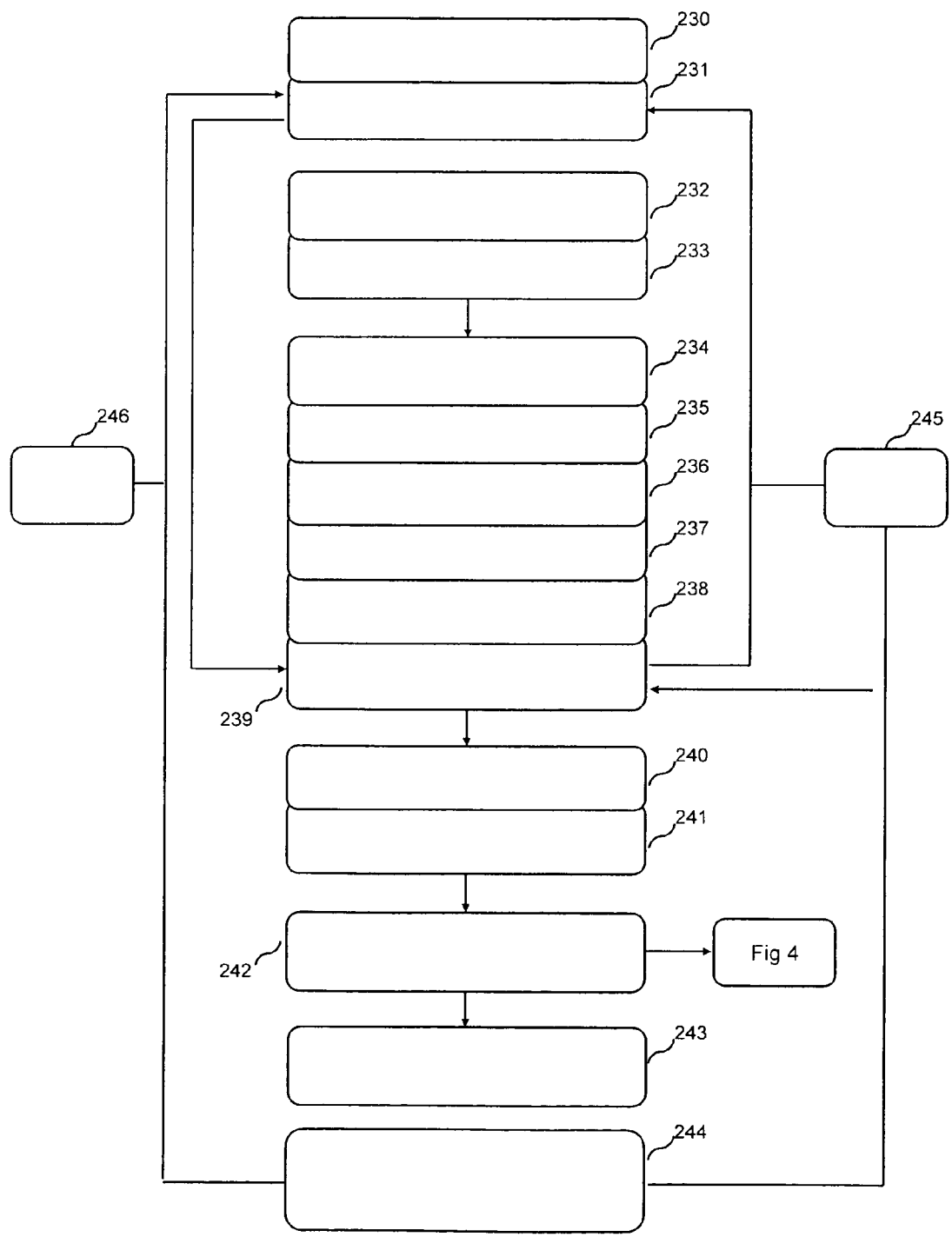
FIG. 10 is a schematic diagram illustrating real time inventory.

As shown in FIG. 10, the implementation of the software and methods of the present invention provide a process of electronically managing, presenting and dynamically allocating real time inventory availability to an order or a promise (Advance Shipping Notice) across a supply chain network with multi suppliers and multi buyers utilising the same functionality, simultaneously. In order to do this, a supplier creates a virtual partition within their Legacy Warehouse Management System 230. The supplier then consigns inventory into that partition ready to be loaded into the system of the present invention 231. As part of the real time inventory process, the systems administrator defines categories and classes by industry and/or supply chain 232, 233. Consequently when a supplier logs in 234 they are able to add new products including product characteristics 235. The supplier may also add a new warehouse, including warehouse characteristics 236 and a warehouse service area 237 and warehouse opening hours 238. This gives the supplier the ability to dynamically consign and allocate products to each buyer 239. Thus, when a buyer logs into the system 240 they are able to allocate an internal product code and resale price 241 which enables the placement of an order 242 (see FIG. 8). The placement of an order 242 causes the inventory to be decremented by the system whereupon the supplier is notified of an electronic order 243. Accordingly, the supplier receives the order and is able to pick the order from the virtual partition within their legacy warehouse management system 244. When a supplier receives an order and dynamically consigns or allocates a product to a buyer 239 the process proceeds according to a business rule for dynamically decrementing stock 245. To decrement stock, a supplier dynamically decrements stock within the system, whereupon stock is decremented within the virtual partition 230. Similarly, a business rule applies to the incrementing of stock 246. To increment stock, suppliers consign stock into the virtual partition 231 whereupon stock is dynamically consigned and allocated within the system.

The present invention provides numerous benefits to customers when compared to existing processes. From the preceding description it will be appreciated that customers are able to check and confirm the availability of products on-line. Unlike existing processes customers are able to arrange delivery and installation, on the spot, at the point of sale. Thus customers are able to, at one time, shop for, complete a purchase, arrange for delivery and installation and arrange for disposal of no longer needed goods and packaging. From the customers perspective, delivery is scheduled at the point of sale to suit the customers time schedule as the date and time of scheduling of delivery and installation are accomplished at the point of sale. Because both the old product and the packaging disposal can be arranged at the point of sale to occur when the new product is delivered, the customer is removed from the disposal process. This helps ensure that large appliances like fridges, washing machines and stove, etc are removed and disposed of according to environmental standards.

The retailer, buyer or commercial buyer also is delivered benefits by practicing the methods and teachings of the present invention. Productivity is enhanced because stock availability is immediately available on-line from suppliers. The system also allows for multi-supplier order integration, multi-service provider advice integration and multi-delivery point shipping advice to carriers, all on one screen. Further, the system provides for the multi-cast of all orders and advice notes in a "one click" process. The buyer is also able to participate in the system using only a web browser and can therefore trial the system on a risk free basis. The trial system is fully scalable to a full systems integration utilising the buyers ERP systems. Further, store inventory orders can be scheduled (date and time slot) to suit buyers and then reconciled electronically. From a storage perspective, the invention results in a reduction of inventory, associated overheads and working capital requirements. The system boosts sales productivity by providing on-line supplier stock availability, on-line supplier ordering at the point of sale and is fully traceable if anything goes wrong with ordering or delivery.

For the supplier of goods (or services) there are numerous advantages. The supplier can forecast dynamically against actual sales, rather than the "just in case" model being used today. Risks are produced by providing a large reduction in excess inventory, and price protection for buyers and inventory right-downs. Warehousing and distribution productivity are improved by providing dynamic inventory availability which is published to all participating buyers. Accordingly, the warehouse is open to buyers on a 24 hour come 7 day a week basis. The system also provides the aforementioned dynamic allocation of inventory to buyers. The system also provides suppliers with a digital record of purchase date and quality of product at the time of delivery for warranty purposes. Suppliers are also provided with on-line instant access to a warranty database. As for the sellers, systems integration can be implemented after the system has been tried, tested and proven to be cost effective, trials being conducted with a conventional browser. Delivery schedules for buyers are pre-booked reducing the instances of refused deliveries at the buyer store or distribution centre level. Further, all returns can be sorted, classified and disposed of without the supplier being involved in the handling of the product.

The invention claimed is:

1. A method of executing a business transaction comprising at least one order on behalf of at least one buyer on a common transaction platform on a central server using a computer network, said method comprising the steps of:

compiling in advance of a buyer query self-published, real-time information from a plurality of product suppliers and/or a plurality of service providers onto said common transaction platform on said central server of said network, said central server having a database storing said compiled, self-published information and being accessible using said network, said self-published information comprising one or more of capability, capacity, availability, area, product, price, service area, category, class and quality;

creating a real-time inventory on said common transaction platform available to order or promise across a supply chain for at least one product supplier and/or at least one service provider, said real-time inventory creating step comprising compiling in advance of a buyer query at least one self-published partitioned inventory by said at least one product supplier and/or said at least service provider, said partitioned inventory being an inventory consigning by said at least one product supplier and/or at least one service supplier into a virtual partition to create said partitioned inventory;

granting a plurality of buyers simultaneous access to the same real-time functionality on the common transaction platform on said central server over said network, said buyers, said products from product suppliers and/ or said services from said service providers being integrated into a single end-to-end supply chain management system in a many-to-many-to-many relationship using said common transaction platform on said central server, the length of the supply chain being longer than two nodes, and each node having a depth of at least one entity, at least one node a plurality of entities independently operate collaboratively, co-operatively, or competitively, and a set of business rules governing each entity's participation and the transactions allowed for that entity, said entities within said supply chain participate without middleware applications or point-to-point messaging, said partitioned inventory being simultaneously accessible to at least one buyer in real-time;

accepting using the common transaction platform on said central server from at least one buyer at least one query as to the real-time availability of a product from at least one product supplier and/or a service from at least one service provider;

responding using said self-published information on the common transaction platform on said central server to said at least one query of said at least one buyer over the network as to the real-time availability of at least one product and/or at least one service;

accepting using the common transaction platform on said central server at least one confirmed order for at least one product from at least one product supplier and/or at least one service from at least one service provider in real-time from said at least one buyer, said order confirmed from said self-published information existing on the common transaction platform on said central server, transaction processing occurring on said central server and not on an entity's server;

allocating part or all of said partitioned inventory to said at least one buyer;

decrementing said allocated partitioned inventory in response to said at least one buyer placing said confirmed order; and automatically transmitting said at least one confirmed order to said at least one product supplier and/or at least one service provider using the common transaction platform on said central server.

2. The method of claim 1, wherein the automatically transmitting step comprises forwarding said at least one confirmed order using an e-mail message from said central server to said at least one product supplier and/or at least one service provider.

3. The method of claim 1, wherein the central server comprises a software module that facilitates the generation of invoices and the settlement of accounts over the network.

4. The method of claim 1, wherein the central server comprises a software module that facilitates the coordination of returns in real time.

5. The method of claim 1, wherein the central server comprises a software module that facilitates the registration of warranty information and automation of a warranty claims process.

6. The method of claim 1, wherein the central server comprises a software module that facilitates the supply of spare parts and provides for the self publication of spare part information selected from the group consisting of spare parts inventory, availability, pricing, shipping status, multi supplier integrated ordering, and fulfillment.

7. The method of claim 1, wherein the central server comprises a software module that enables a product supplier to supply or multicast product information to at least one buyer.

8. The method of claim 1, wherein at each node of the supply chain multiple entities independently operate collaboratively, co-operatively or competitively.

9. The method of claim 1, wherein a particular entity at a particular node adopts an operating model or structure that is different from other entities on that same node.

10. The method of claim 1, wherein at least one entity chooses to participate selectively.

11. The method of claim 1, further comprising exporting data from a plurality of entities into said central server, each entity having a different legacy system, and receiving data from the central server by said plurality of entities through a common transaction platform on said central server and at least one common adaptor.

12. The method of claim 1, wherein said automatically transmitting step comprises forwarding a message service (SMS) text message to a mobile phone or a Wireless Application Protocol (WAP) device.

13. The method of claim 1, wherein said set of business rules are codified in software and are capable of being selectively applied.

14. The method of claim 1, wherein the business rules are applied to both the transaction and to the process of execution of that transaction.

15. The method of claim 1, wherein the business rules are capable of being changed to accommodate the needs of specific supply chain entities while preserving a common structure in the transaction processing.

16. The method of claim 1, wherein a plurality of supply chains are integrated into a network of supply chains.

17. The method of claim 11, wherein at least one entity bulk uploads data into the central server without the need to re-key data.

18. The method of claim 11, wherein business rules are applied to bulk data to be exported from a legacy system of an entity into said central server.

19. The method of claim 18, wherein said business rules are applied to the data of completed transactions, which is exported from the central server back to a particular entity's legacy system as input data to that legacy system.

20. The method of claim 1, wherein an entity offers at least a portion of its products and services, or at least a portion of its capability and capacity, and is adapted to change these dynamically.

21. The system of claim 1, wherein the business rules are capable of being changed to accommodate the needs of specific supply chain entities while preserving a common structure in the transaction processing.

22. The system of claim 1, wherein a plurality of supply chains are integrated into a network of supply chains.

23. The method of claim 1, wherein at least one service provider is selected from the group consisting of a carrier, an installer, and a field service provider.

24. The method of claim 1, wherein simultaneous multiple queries as to the real-time availability of a product from at least one product supplier and/or a service from at least one service provider are accepted.

25. The method of claim 24, wherein simultaneous multiple queries are responded to using said self-published information on the common transaction platform on said central server as to the real-time availability of at least one product and/or at least one service.

26. The method of claim 25, wherein simultaneous multiple confirmed orders from said at least one buyer are accepted using the common transaction platform on said central server in real-time.

27. The method of claim 26, wherein simultaneous multiple confirmed orders are concurrently automatically transmitted to a plurality of product suppliers and/or a plurality of service providers.

28. The method of claim 1, wherein the central server comprises a software module that enables a service provider to supply or multicast service information to at least one buyer.

29. The method of claim 1, wherein said step of accepting said at least one confirmed order comprises the steps of:
integrating information about said at least one order in one screen; and
confirming said at least one order by said at least one buyer by clicking a button in a graphical user interface.

30. The method of claim 1, wherein said real-time inventory creating step comprises the steps of:
creating a virtual partition within a legacy warehouse management system of at least one product supplier; and
consigning by said at least one product supplier and/or said at least one service provider inventory into said virtual partition to create a partitioned inventory.

31. The method of claim 30, wherein said part or all of said partitioned inventory is dynamically allocated to said at least one buyer.

32. A system for executing a business transaction comprising at least one order on behalf of at least one buyer on a common transaction platform on a central server using a computer network, comprising:
a central server coupled to said network;
a common transaction platform implemented on said central server;
means for compiling in advance of a buyer query self published, real-time information from a plurality of product suppliers and/or a plurality of service providers onto said common transaction platform on said central server of said network, said central server having a database storing said compiled, self-published information and being accessible using said network, said self-published information comprising one or more of capability, capacity, availability, area, product, price, service area, category, class and quality;
means for creating a real-time inventory on said common transaction platform available to order or promise across a supply chain for at least one product supplier and/or at least one service provider, said real-time inventory creating means comprising means for compiling in advance of a buyer query at least one self-published partitioned inventory by said at least one product supplier and/or said at least service provider, said partitioned inventory being an inventory consigning by said at least one product supplier and/or at least one service supplier into a virtual partition to create said partitioned inventory;
means for granting a plurality of buyers simultaneous access to the same real-time functionality on the common transaction platform on said central server over said network, said buyers, said products from product suppliers and/or said services from said service providers being integrated into a single end-to-end supply chain management system in a many-to-many-to-many relationship using said common transaction platform on said central server, the length of the supply chain being longer than two nodes, and each node having a depth of at least one entity, at least one node a plurality of entities independently operate collaboratively, co-operatively, or competitively, and a set of business rules governing each entity's participation and the transactions allowed for that entity, said entities within said supply chain participate without middleware applications or point-to-point messaging, said partitioned inventory being simultaneously accessible to at least one buyer in real-time;
means for accepting using the common transaction platform on said central server from at least one buyer at least one query as to the real-time availability of a product from at least one product supplier and/or a service from at least one service provider;
means for responding using said self-published information on the common transaction platform on said central server to said at least one query of said at least one buyer over the network as to the real-time availability of the at least one product and/or at least one service;
means for accepting using the common transaction platform on said central server at least one confirmed order for at least one product from at least one product supplier and/or at least one service from at least one service provider in real-time from said at least one buyer, said order confirmed from said self-published information existing on the common transaction platform on said central server, transaction processing occurring on said central server and not on an entity's server;
means for allocating part or all of said partitioned inventory to said at least one buyer;
means for decrementing said allocated partitioned inventory in response to said at least one buyer placing said confirmed order; and
means for automatically transmitting said at least one confirmed order to said at least one product supplier and/or at least one service provider using the common transaction platform on said central server.

33. The system of claim 32, wherein the means for automatically transmitting forwards said at least one confirmed order using an e-mail message from the central server to said at least one product supplier and/or at least one service provider.

34. The system of claim 32, wherein the central server is configured with a software module that facilitates the generation of invoices and the settlement of accounts of the network.

35. The system of claim 32, wherein the central server is configured with a software module that facilitates the coordination of returns in real time.

36. The system of claim 32, wherein the central server is configured with a software module that facilitates the registration of warranty information and automation of a warranty claims process.

37. The system of claim 32, wherein the central server is configured with a software module that facilitates the supply of spare parts and provides for self publication of spare part information selected from the group consisting of spare parts inventory, availability, pricing, shipping status, multi supplier integrated ordering, and fulfillment.

38. The system of claim 32, wherein the central server is configured with a software module that enables a product supplier to supply or multicast product information to at least one buyer.

39. The system of claim 32, wherein at each node of the supply chain multiple entities independently operate collaboratively, co-operatively or competitively.

40. The system of claim 32, wherein a particular entity at a particular node adopts an operating model or structure that is different from other entities on that same node.

41. The system of claim 32, wherein a plurality of entities, each of which has a different legacy system, export data into the central server and receive data from the central server by said plurality of entities through a common transaction platform on said central server and at least one common adaptor.

42. The system of claim 32, wherein said means for automatically transmitting forwards a short message service (SMS) text message to a mobile phone or to a Wireless Application Protocol (WAP) device.

43. The system of claim 32, wherein the business rules are applied to both the transaction and to the process of execution of that transaction.

44. The system of claim 41, wherein at least one entity bulk uploads data into the central server without the need to re-key data.

45. The system of claim 41, wherein said business rules are applied to bulk data to be exported from a legacy system of an entity into said central server.

46. The system of claim 45, wherein business rules are applied to the data of completed transactions, which is exported from the central server back to a particular entity's legacy system as input data to that legacy system.

47. The system of claim 32, wherein an entity offers at least a portion of its products and services, or at least a portion of its capability, and is adapted to change these dynamically.

48. The system of claim 32, wherein at least one service provider is selected from the group consisting of a carrier, an installer, and a field service provider.

49. The system of claim 32, wherein simultaneous multiple queries as to the real-time availability of a product from at least one product supplier and/or a service from at least one service provider are accepted.

50. The system of claim 49, wherein simultaneous multiple queries are responded to using said self-published information on the common transaction platform on said central server as to the real-time availability of at least one product and/or at least one service.

51. The system of claim 50, wherein simultaneous multiple confirmed orders from said at least one buyer are accepted using the common transaction platform on said central server in real-time.

52. The system of claim 51, wherein simultaneous multiple confirmed orders are concurrently automatically transmitted to a plurality of product suppliers and/or a plurality of service providers.

53. The system of claim 32, wherein the central server is configured with a software module that enables a service provider to supply or multicast service information to at least one buyer.

54. The system of claim 32, wherein said means for accepting said at least one confirmed order comprises:
 means for integrating information about said at least one order in one screen; and
 means for confirming said at least one order by said at least one buyer by clicking a button in a graphical user interface.

55. The system of claim 32, wherein said real-time inventory creating means comprises:
 means for creating a virtual partition within a legacy warehouse management system of at least one product supplier; and
 means for consigning by said at least one product supplier and/or at least one service inventory into said virtual partition to create a partitioned inventory.

56. The system of claim 55, wherein said part or all of said partitioned inventory is dynamically allocated to said at least one buyer.

57. A medium readable by a computer having stored therein application software modules, executable by said computer in a database environment, for executing a business transaction comprising at least one order on behalf of at least one buyer on a common transaction platform on a central server using a computer network, said modules comprising:
 an application software module for compiling in advance of a buyer query self published, real-time information from a plurality of product suppliers and/or a plurality of service providers onto said common transaction platform on said central server of said network, said central server having a database storing said compiled, self-published information and being accessible using said network, said self-published information comprising one or more of capability, capacity, availability, area, product, price service area, category, class, and quality;
 an application software module for creating a real-time inventory on said common transaction platform available to order or promise across a supply chain for at least one product supplier and/or at least one service provider, said real-time inventory creating step comprising compiling in advance of a buyer query at least one self-published partitioned inventory by said at least one product supplier and/or said at least service provider, said partitioned inventory being an inventory consigning by said at least one product supplier and/or at least one service supplier into a virtual partition to create said partitioned inventory;
 an application software module for granting a plurality of buyers simultaneous access to the same real-time functionality on the common transaction platform on said central server over said network, said buyers, said products from product suppliers and/or services from said service providers being integrated into a single end-to-end supply chain management system in a many-to-many relationship using said common transaction platform on said central server, the length of the supply chain being longer than two nodes, and each node having a depth of at least one entity, at least one node a plurality of entities independently operate collaboratively, co-operatively, or competitively, and a set of business rules governing each entity's participation and the transactions allowed for that entity, said entities within said supply chain participate without middleware application or point-to-point messaging, said partitioned inventory being simultaneously accessible to at least one buyer in real-time;
 an application software module for accepting using the common transaction platform on said central server from the at least one buyer at least one query as to the real-time availability of a product from at least one product supplier and/or a service from at least one service provider;
 an application software module for responding using said self published information on the common transaction platform on said central server to said at least one query of said at least one buyer over the network, as to the real-time availability of at least one product and/or at least one service;
 an application software module for accepting using the common transaction platform on said central server at least one confirmed order for at least one product from at least one product supplier and/or at least one service from at least one service provider in real-time from said at least one buyer, said order confirmed from said self-published information existing on the common transaction platform on said central server, transaction processing occurring on said central server and not on an entity's server;

an application software module for allocating part or all of said partitioned inventory to said at least one buyer;

an application software module for decrementing said allocated partitioned inventory in response to said at least one buyer placing said confirmed order; and an application software module for automatically transmitting said at least one confirmed order to said at least one product supplier and/or at least one service provider using the common transaction platform on said central server.

58. The medium of claim 57, wherein said application software module for real-time inventory creating comprises:

an application software module for creating a virtual partition within a legacy warehouse management system of at least one product supplier; and an application software module for consigning by said at least one product supplier and/or at least one service inventory into said virtual partition to create a partitioned inventory.

59. The medium of claim 58, wherein said part or all of said partitioned inventory is dynamically allocated to said at least one buyer.

* * * * *